Figure 1:
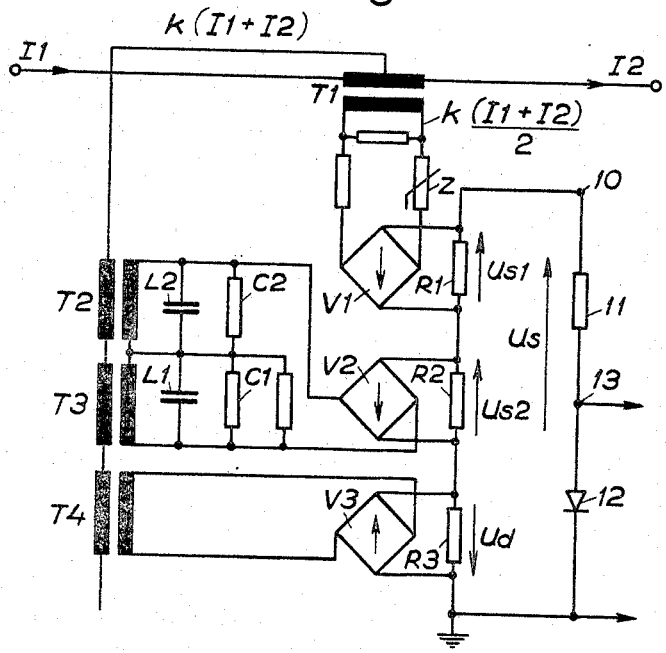

United States Patent Office 3,337,772
Patented Aug. 22, 1967

3,337,772
TRANSFORMER DIFFERENTIAL PROTECTION
Stig Andersson, Vasteras, Sweden, assignor to Allmänna
 Svenska Elektriska Aktiebolaget, Vasteras, Sweden, a
 Swedish corporation
Filed Dec. 14, 1964, Ser. No. 418,062
Claims priority, application Sweden, Dec. 28, 1963,
14,522/63
1 Claim. (Cl. 317—14)

A transformer differential protection device is usually based on the principle that the sum and the difference of the currents which go to and from a transformer are formed. The difference current operates in a tripping direction and the sum current in a stabilising direction on the protection device. A certain difference current flows all the time because of losses in the transformer, that is even with normal load of a fault-free transformer, so that the protection device must be so adjusted that the difference current must exceed a certain threshold value before tripping can be carried out. With over-current the difference current also rises and it is therefore necessary to introduce a tripping stabilising for the over-current. In this the sum current is used and a magnitude proportional to the sum current is used for stablisation.

Upon connection of a transformer a strong increase of the difference current arises and the protection device must therefore be stabilised against undesirable tripping caused by this increase. Many solutions of the problem have been put forward, amongst others the use of filters for filtering out the second harmonic which occurs strongly in the connection current impulse. The filtered out harmonic is rectified and is used as the stabilising magnitude. Other ways of stabilising for tripping during connection of the transformer are also known.

When over-voltage appears on a transformer, the difference current increases and this can cause unwanted tripping if no measures are taken against this. Upon over-voltage the difference current contains a considerable percentage of the fifth harmonic and it has therefore been proposed to filter away this harmonic and use it as a stabilising magnitude in order to prevent the protection device from tripping with over-voltage on a fault-free transformer.

Certain internal faults in transformers cause the difference current to contain a high percentage of the third harmonic. Because of imperfections in the said filters for second and fifth harmonics, these will release a part of the third harmonic, which will then function in a stabilising manner. It has however been proved that by suitable combination and dimensioning of said two filters, they can function jointly as a blocking filter for the third harmonic, so that the increased difference current at the said type of internal fault effects tripping, even if the increase is not specially great.

With the above described arrangement, it is thus possible to derive a voltage out of the difference current which functions in a tripping direction. In the stabilising direction the voltages function which are proportional to the sum current, to the percentage of the second harmonic during the connection period and to the percentage of the fifth harmonic upon over-voltage. These voltages are added together and the sum voltage is supplied to a relay or another device which controls the tripping device for the transformer circuit breaker.

During the connection period and upon over-voltage when the percentage of harmonics in the difference current is high, very high voltage peaks in the difference voltage will arise. These voltage peaks however have short durability, but in the use of electrical measuring devices for controlling the transformer breaker, the tripping will take place if no precautions are taken, because of the fact that a similar measuring device works very rapidly.

The present invention refers to a transformer differential protection device which is stabilised against unwanted releasing by means of a rectified voltage derived from the fundamental tone and harmonics of the network voltage, which is opposite to a rectified voltage derived from the difference current operating in a tripping direction. The invention is characterised by a pulse generating device, whose input is arranged to be supplied with a magnitude which is proportional to the difference between said two rectified voltage, and that the pulse generating device is arranged to give an output signal in the form of pulses as long as the absolute value of said difference magnitude is at least as great as the absolute value of a reference magnitude and both magnitudes at the same time have the same polarity and where the length of the pulse is determined by the time during which the instantaneous value of the difference magnitude exceeds the reference magnitude. The pulses generated in the pulse generating device are supplied to a time circuit which is arranged to give an output signal if each one of a number of pulses succeeding each other has a length which exceeds a determined value, but which does not give an output signal if the length of a single supplied pulse falls below a determined value.

A differential protection device according to the invention gives a quick tripping impulse upon an internal fault in the transformer because long voltage pulses then occur with an amplitude which exceeds the reference voltage, while during the connection period and over-voltage no tripping is produced, because the pulses then generated are too short.

Figure 2:
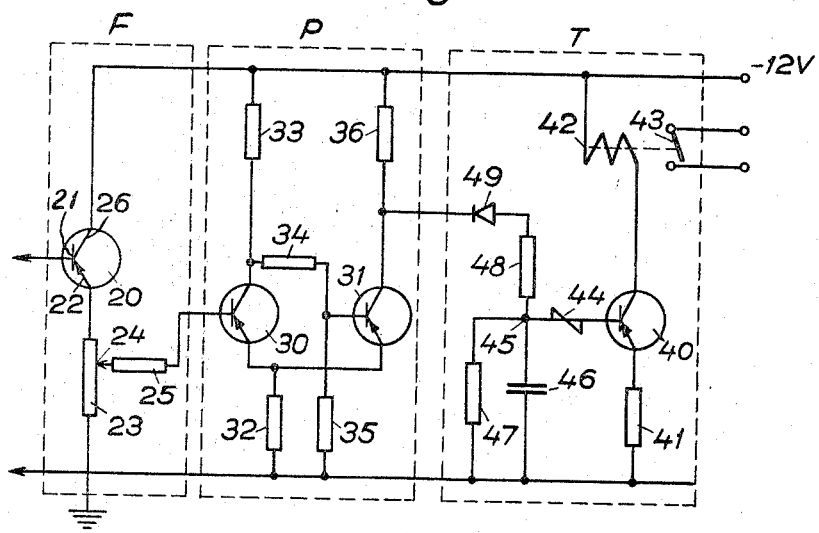

In the accompanying drawing FIG. 1 shows a filter circuit for a transformer differential protection device, to which a device according to the invention can be connected. FIG. 2 shows a device according to the invention. FIGS. 3–7 show the variations of the voltages in stabilising and releasing directions and the difference voltage under various different conditions.

From two current transformers not shown there are supplied to the primary winding of a transformer $T_1$ partly a current $I_1$, which is proportional to the current on the one side of the transformer which is to be protected and partly a current $I_2$, which is proportional to the current on the other side of the transformer which is to be protected. From the secondary winding of the transformer $T_1$, a current proportional to $$\frac{I_1 + I_2}{2}$$

is tapped, which is supplied over a voltage dependent resistor Z to a rectifier bridge $V_1$. Across the D.C. outlet of the rectifier bridge a resistor $R_1$ is connected and by this means a voltage $U_{s1}$ occurs across the resistor. This voltage is indicated in a downward direction in the figure, by which it is indicated that it operates in the stabilising direction. By a suitable choice of the non-linear resistor Z and possibly in combination with a linear resistor, the equation.

$$U_{s1} = f\left(\frac{I_1 + I_2}{2}\right)$$

can be given a suitable form, so that the voltage $U_{s1}$ under all conditions operates in a stabilising direction against tripping because of over-current.

From a centre outlet on the primary winding of the transformer $T_1$, a difference current $I_1 - I_2$ is selected in a known way. It is supplied in series to the primary windings of three transformers $T_2$, $T_3$ and $T_4$. For all transformers in the protection device there is a large current primary and a voltage proportional to the primary current secondary, so that they must have an air gap in the core.

Upon internal faults in the transformer which is being protected, the difference current $I_1-I_2$ increases. This current is taken off over the transformer $T_4$, rectified in the rectifier bridge $V_3$ and supplied to the resistor $R_3$, across which a voltage $U_d$ is generated, which operates in the tripping direction on the protection device and is therefore directed against the voltage $U_{s1}$ shown earlier.

Upon connection of a transformer, a strong difference current occurs. Thereby the voltage $U_d$ increases considerably and, if no measures are taken against this, the protection device would trip. In order to prevent this, the protection device must be stabilised against tripping because of the connection current impulse. The connection stabilisation is based upon the fact that the connection current and thereby also the difference current contain a high percentage of the second harmonic. The transformer protection device is therefore equipped with a pass filter $L_2$, $C_2$ for the second harmonic. The strong current impulse of the second harmonic, which occurs upon a connection, is rectified in a bridge $V_2$ and is supplied to a resistor $R_2$, so that across the resistor $R_2$ a voltage $U_{s2}$ is generated in the stabilising direction. The two stabilising voltages $U_{s1}$ and $U_{s2}$ are combined into a total stabilising voltage $U_s$. As long as this voltage is greater than the voltage $U_d$ operating in the tripping direction, the protection device is stabilised against tripping.

The protection device is also stabilised against increase in the difference current caused by over-voltage. Upon an over-voltage the percentage of the difference current of the fifth harmonic will increase. By arranging a pass filter which consists of the secondary winding $L_1$ of the transformer $T_3$ and the condenser $C_1$ and which allows the fifth harmonic to pass, a voltage $U_{s2}$ is obtained across the rectifier bridge $V_2$ and the resistor $R_2$ which gives a stabilising effect in the same way as described for the connection current impulse.

Upon certain types of internal faults the difference current contains a high percentage of the third harmonic. If no special measures are taken against this, the filter circuits $L_1$, $C_1$ and $L_2$, $C_2$ will allow a considerable part of said harmonic to pass which then will operate in a stabilising way also upon an internal fault, for which the protection device should trip. Therefore, the filter circuits $L_1$, $C_1$ and $L_2$, $C_2$ are dimensioned so that the first gives stabilisation upon at connection and the second upon over-voltage, while the circuits together block the third harmonic and thereby prevent unwanted stabilisation upon the occurrence of faults which give a high percentage of the third harmonic in the difference current.

The resultant difference voltage $U_s-U_d$ then lies between a point 10 and earth across a large resistor 11 and a valve 12. As long as the transformer is fault-free and $U_s$ is greater than $U_d$, the point 13 between the resistor 11 and the valve 12 has a potential which is positive and at most equals the forward voltage drop of the diode in relation to earth.

The voltages, which the filter circuit shown in FIG. 1 passes, can become very high and must be limited in order not to disturb the transistors in the succeeding measuring part. The limiting is suitably maintained by the valve 12 limiting positive voltages and the first transistor in the measuring part plus resistor 11 limiting negative voltages. The voltage between point 13 and earth can with such an arrangement not assume a higher value than that which the measuring part has.

The measuring part of the differential protection device shown in FIG. 2 is intended to be connected between the point 13 and earth in the filter circuit. It consists of an amplifier step F, a pulse generating device P and a time circuit T. The amplifier step, which is placed between the filter circuit and the pulse generating device in order not to load the filter, should give the same output voltage as input voltage, but should have high input impedance and low output impedance. The amplifier step consists of a transistor 20, whose base 21 is connected to the point 13 in the filter circuit. The emitter of the transistor 22 is connected to earth over the end terminals of a potentiometer 23, whose moving terminal 24 is connected to the base of a transistor in the pulse generating device over a resistor 25. The collector 26 of the transistor 20 is connected to the negative pole of the current source, which feeds the measuring part.

The pulse generating device P is a Schmitt-trigger connection with two transistors 30 and 31, which have a common emitter resistor 32. The base of the transistor 30 is connected to the resistor 25 in the amplifier step F, while the collector of the transistor is connected to the previously mentioned current source over the resistor 33. The collector is besides connected to earth over the resistors 34 and 35. The base of the transistor 31 is connected to a point between the resistors 34 and 35, while its collector is connected to the current source over the resistor 36.

The time circuit T contains a transistor 40, whose emitter is connected to earth over a resistor 41, while its collector is connected to the voltage source over the winding 42 in a tripping relay with a tripping contact 43. The base of the transistor is connected to a point 45 over a Zener diode 44. This point is connected to earth partly over a condenser 46, and partly over a resistor 47, which is a discharging resistance for the condenser. Further, the point 45 is connected over a resistor 48 and a valve 49 to the collector of the transistor 31 in the pulse generating device.

The emitter resistor arranged jointly in the pulse generating device is dimensioned so that the voltage of the emitter of the transistor 30 is approximately $-1$ volt. When the transformer is fault free the voltage of the base is more positive than the emitter voltage so that the transistor is non-conducting. The resistors 33, 34 and 35 are so chosen that the base of the transistor 31 is more negative than the emitter so that this transistor conducts. The resistor 36 is much greater than the resistor 32 and the consequence of this is that the collector of the transistor 31 and thereby also the valve 49 lies near earth potential. The forward voltage drop over the valve 49 in combination with the resistor 48 ensures that the condenser 48 does not receive any discharge current and the time circuit T is in rest position.

If on the other hand some such fault occurs that the difference between $U_d$ and $U_s$ becomes more negative than the reference voltage adjusted in the pulse generating circuit, the transistor 30 becomes conducting. At the same time, the transistor 31 is blocked and its collector is now negative. This means that the condenser 46 receives charging current over the resistor 48, the valve 49 and the resistor 36. If this charging lasts so long that the voltage of the condenser exceeds the blocking voltage of the Zener diode 44, the transistor 40 becomes conducting and the relay coil 42 receives current and tripping is carried out. If the time during which the transistor 31 is blocked is so short that the voltage of the condenser 46 does not reach the blocking voltage of the diode 44, no tripping is carried out and the condenser is discharged over the resistor 47. It is also possible by dimensioning the capacity of the condenser 46 or the blocking voltage of the diode 44 to determine the time which will elapse from the time when a fault occurs until the tripping takes place.

Figure 5:
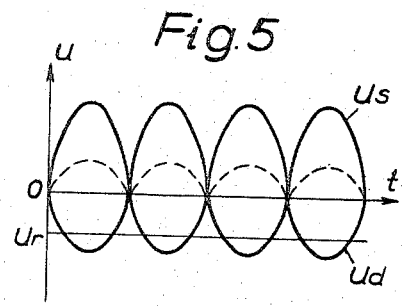
Figure 6:
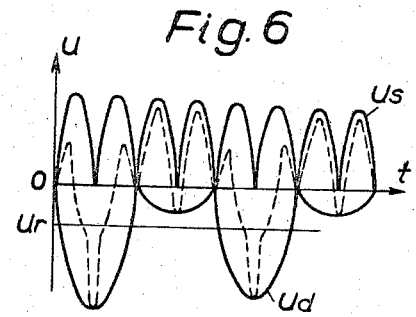
Figure 7:
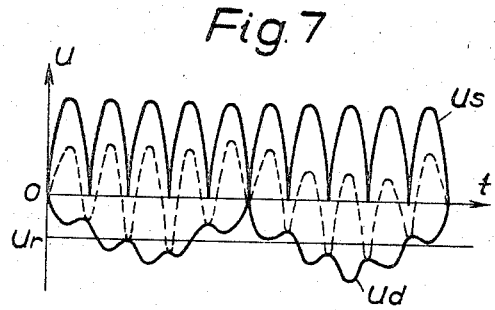

With reference to FIGS. 3–7 the function of the differential protection device at various different operations during the transformer will be clarified. Since two-way rectifying is made in the rectifier bridges $V_1$, $V_2$ and $V_3$, the voltages over the resistors $R_1$, $R_2$ and $R_3$ will be composed of pulsating direct current voltages with the pulse length 10 msec. FIGS. 3–6 correspond to two whole cycles of the network voltage, while FIG. 7 shows only one cycle.

Figure 3:
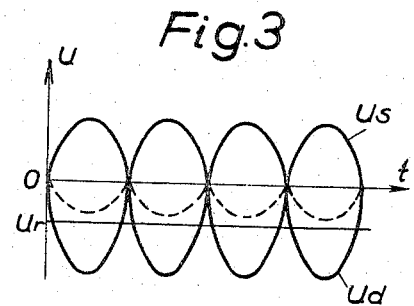

FIG. 3 shows the appearance of the stabilising voltage $U_s$ and the difference voltage $U_d$ with fault-free transformers. The difference between them is shown with broken lines and, as can be seen, this difference is positive in relation to the reference voltage, so that no tripping occurs.

Figure 4:
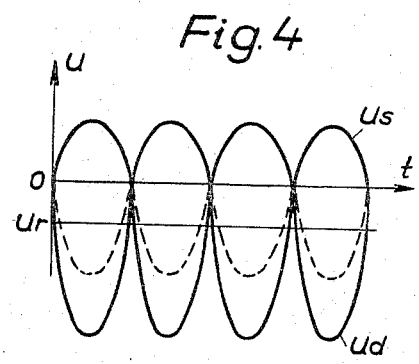

FIG. 4 shows the process during an internal fault at the transformer. The difference voltage $U_d$ reaches a very high value. The amplitude of the difference voltage becomes considerably greater than the reference voltage and the time for each half period during which the amplitude of the difference voltage exceeds the adjusted reference voltage only becomes somewhat less than 10 msec. The time interval between two pulses, during which the condenser does not receive charging current, but is discharged, is in such cases very short. If one assumes that the condenser requires 15 msec. to reach the blocking voltage for the Zener diode and that further three msec. are required in order that the relay shall safely receive a tripping impulse, thus 18 msec. are required for constant charging of the condenser. Following on this, upon an internal fault in the transformer, the relay can receive tripping impulse after three charging intervals for the condenser 46, which approximately corresponds to one and a half periods for the network voltage or 30 msec. These values are to be considered as approximately average values, since they are dependent on the size of the fault current.

Upon external faults, $U_s$ increases and the difference voltage between $U_s$ and $U_d$ becomes positive, so that the transistor 30 remains blocked. This case is shown in FIG. 5.

FIG. 6 shows the operation during the connection of a transformer. Here a building up process occurs so that the rectified difference voltage receives a strong peak for each period of the network voltage. However, the difference current contains a high percentage of the second harmonic, which is filtered out and is used for stabilising. The difference voltage receives a high but acute amplitude peak once per period of the network voltage and the length of the time interval during which the difference voltage exceeds the reference voltage is less than 5 msec. so that the transistor 40 remains blocked. Because of greater inertia of the filter transformer $T_2$ than of the transformer $T_4$, during the first period two pulses can be received, whose length exceeds 5 msec. Therefore, the circuit is arranged not to give an output signal even if th length of the first impulse exceeds 5 msec. but does not exceed 18 msec.

FIG. 7 finally shows the process with over-voltage. The difference voltage exceeds the reference voltage during a relatively great part of the period, but since the difference current contains a high percentage of the fifth harmonic and this is used in stabilising direction, the difference voltage will exceed the reference voltage only during very short intervals, which, according to what has been stated previously, does not cause tripping.

According to the invention the time circuit is thus passive as long as the difference voltage derived from the sum current and the difference voltage is less than a controllable reference voltage. The time circuit gives a tripping impulse to the transformer breaker first when said difference voltage exceeds the reference voltage during a certain, adjustable minimum time. By this means a differential protection is maintained which gives tripping for possible transformer faults, but not for faults outside the transformer or upon connection or over-voltage.

I claim:

Transformer differential protection equipment for protecting transformers connected in an alternating current power system, said equipment having a voltage generating device comprising means for deriving from said system a first current varying in dependence on the sum of the currents flowing into and out of said transformers, means for deriving from said system a second current varying in dependence on the difference of the currents flowing into and out of said transformers, means for generating a first and a second direct voltage in dependence on said first and second derived currents, a filter device, said filter device being connected to said means for deriving from said system a second current varying in dependence on the difference between the currents flowing into and out of said transformers, said filter device comprising a pass filter for the second harmonic, a block filter for the third harmonic, and a pass filter for the fifth harmonic, said two pass filters being connected together to said block filter, means for generating a third direct voltage in dependence on the output of said filter device, means to add together said first and third voltages to form a restraint voltage, the difference between said restraint and said second voltages forming a tripping voltage lying across two output terminals of said voltage generating device, the combination with said voltage generating device of a tripping device, said tripping device having an amplifier step including a transistor, the base-emitter circuit of said transistor being connected to the output terminals of said voltage generating device, a potentiometer with a movable terminal in said base-emitter circuit, a pulse generating circuit including two transistors in parallel, the base of the first of said two transistors being connected to said movable terminal, the collector of said first transistor being connected to the base of the second of said two transistors, a time circuit including a transistor, a capacitor and a resistor connected in parallel to the base-emitter circuit of said transistor of said time circuit, a valve in the emitter-collector circuit of the second transistor of the pulse generating circuit, said capacitor being connected in series with said valve, a tripping relay, the winding of said tripping relay being connected to the collector of the transistor of said time circuit.

References Cited

UNITED STATES PATENTS 3,144,586 8/1964 Gambale _____ 317—33 X
3,218,516 11/1965 Sharp _____ 317—14 X MILTON O. HIRSHFIELD, *Primary Examiner.*

J. D. TRAMMELL, *Assistant Examiner.*